US010785385B2

(12) United States Patent
Beckett, III et al.

(10) Patent No.: US 10,785,385 B2
(45) Date of Patent: Sep. 22, 2020

(54) SYSTEMS AND METHODS FOR ALIGNING TEXT AND MULTIMEDIA CONTENT

(71) Applicant: NBCUniversal Media, LLC, New York, NY (US)

(72) Inventors: William R. Beckett, III, Marlboro, NJ (US); Gaurav Gupta, Lodi, NJ (US)

(73) Assignee: NBCUniversal Media, LLC., New York, NY (US)

( * ) Notice: Subject to any disclaimer, the term of this patent is extended or adjusted under 35 U.S.C. 154(b) by 0 days.

(21) Appl. No.: 16/232,833

(22) Filed: Dec. 26, 2018

(65) Prior Publication Data
US 2020/0213478 A1    Jul. 2, 2020

(51) Int. Cl.
*H04N 5/04*      (2006.01)
*H04N 7/025*     (2006.01)
*H04N 7/088*     (2006.01)
*H04N 21/488*    (2011.01)
*G06F 40/289*    (2020.01)

(52) U.S. Cl.
CPC ............ *H04N 5/04* (2013.01); *G06F 40/289* (2020.01); *H04N 7/0255* (2013.01); *H04N 7/0882* (2013.01); *H04N 21/4884* (2013.01); *H04N 21/4888* (2013.01)

(58) Field of Classification Search
CPC ...... H04N 5/04; H04N 7/0255; H04N 7/0882; G06F 40/289
See application file for complete search history.

(56) References Cited

U.S. PATENT DOCUMENTS

| 7,668,718 | B2 | 2/2010 | Kahn et al. | |
| 8,131,545 | B1* | 3/2012 | Moreno | G10L 15/04 |
| | | | | 704/235 |
| 8,719,024 | B1 | 5/2014 | Moreno et al. | |
| 2002/0087569 | A1* | 7/2002 | Fischer | H04N 21/235 |
| 2008/0046229 | A1 | 2/2008 | Maskey et al. | |
| 2011/0040559 | A1* | 2/2011 | Kim | H04N 21/4884 |
| | | | | 704/231 |
| 2011/0288862 | A1* | 11/2011 | Todic | G10L 15/05 |
| | | | | 704/235 |
| 2013/0100347 | A1* | 4/2013 | Zinovieva | H04N 21/4307 |
| | | | | 348/468 |

(Continued)

*Primary Examiner* — Randy A Flynn
(74) *Attorney, Agent, or Firm* — Fletcher Yoder, P.C.

(57) ABSTRACT

The present disclosure is generally directed to a tangible, non-transitory machine-readable medium that includes machine-readable instructions that, when executed by processing circuitry, cause the processing circuitry to receive multimedia content that includes a plurality of multimedia content portions of the multimedia content. The instructions, when executed by the processing circuitry, also cause the processing circuitry to receive text data corresponding to words spoken in the multimedia content. The text data includes a plurality of text data subdivisions of the text data. Moreover, the instructions, when executed by the processing circuitry, cause the processing circuitry to align the multimedia content and the text data by determining, for each of the plurality of multimedia content portions, a corresponding subdivision of the plurality of text data subdivisions. Furthermore, the instructions, when executed by the processing circuitry, cause the processing circuitry to cause display of the multimedia content aligned to the text data.

20 Claims, 10 Drawing Sheets

(56) References Cited

U.S. PATENT DOCUMENTS

| | | |
|---|---|---|
| 2013/0124203 A1 | 5/2013 | Scoggins, II et al. |
| 2013/0124984 A1* | 5/2013 | Kuspa .................. H04N 21/435 715/255 |
| 2014/0040713 A1 | 2/2014 | Dzik et al. |
| 2014/0163981 A1 | 6/2014 | Cook et al. |
| 2017/0062010 A1* | 3/2017 | Pappu .................... G10L 15/265 |
| 2018/0130483 A1* | 5/2018 | Dimino, Jr. ........ H04N 21/4307 |

* cited by examiner

```
                                    ┌─200
          ┌─────────────────────────────────────────┐
          │ CHAPTER                                 │
     204 ─┼─► int id;                               │
     206 ─┼─► double startsec;                      │
     208 ─┼─► double endsec;                        │
     210 ─┼─► double duration;                      │
     212 ─┼─► paragraphList = new ArrayList<>();    │
          └─────────────────────────────────────────┘

┌─202
          ┌─────────────────────────────────────────────────┐
          │ PARAGRAPH                                       │
     220 ─┼─► int id;                                       │
     222 ─┼─► String originalText;                          │
     224 ─┼─► String prunedText;                            │
FIG. 4   226 ─┼─► String expandedText;                      │
     228 ─┼─► double adjStartsec;                           │
     230 ─┼─► boolean isAligned =                           │
     232 ─┼─► double manualStartSec;                        │
     234 ─┼─► boolean isManual = false;                     │
     236 ─┼─► double adjEndsec;                             │
     238 ─┼─► int confidenceLevel;                          │
     240 ─┼─► int noOfNoiseSegments;                        │
     242 ─┼─► ArrayList<String> wordList = new ArrayList<>();│
     244 ─┼─► int kwsWordOffset;                            │
     246 ─┼─► double avgWordDuration = DEFAULT_WORD_DURATION_SECONDS;│
     248 ─┼─► kwsSearchList = new ArrayList<>();            │
     250 ─┼─► kwsResultList = new ArrayList<>();            │
          └─────────────────────────────────────────────────┘
```

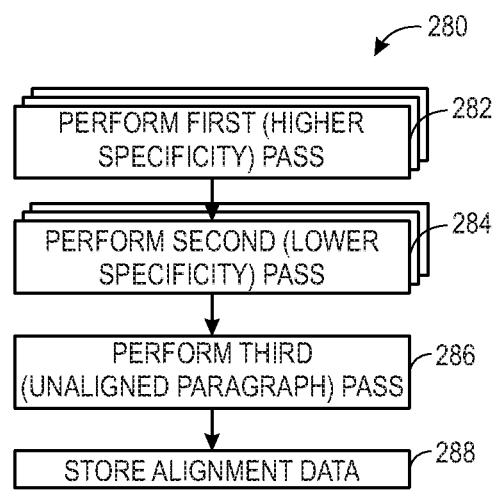

FIG. 5

SYSTEMS AND METHODS FOR ALIGNING TEXT AND MULTIMEDIA CONTENT

BACKGROUND

The present disclosure relates generally to the synchronization of multimedia content with text. More particularly, the present disclose relates to aligning text, such as transcripts, with video content, including in cases when the dialogue in the video content differs from the text.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Multimedia content may be associated with text. For example, video content may include spoken words. The spoken words may be reflected in text form, such as a transcript. However, in some cases, the written form of the words spoken in multimedia content may differ from the words actually spoken in the multimedia content. For example, if the transcript is a prepared document that a person is to read (e.g., during a broadcast or another recorded event) the person speaking may say some of the words in the transcript, but may also say different words, add words, or otherwise not speak some of the words included in the transcript. Further, in some embodiments, transcripts may be edited for visual consumption, by adding editing features, such as section breaks, removed redundant text, etc.

Aligning, or synchronizing, text from the written text with the multimedia content for playback is traditionally performed manually and can be time-consuming and labor-intensive, particularly for projects involving relatively large amounts of content. Moreover, automating the alignment of the text and the multimedia may prove to be inaccurate, especially in cases in which the text and spoken words in the multimedia content differ from one another.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The current embodiments relate to systems and methods for aligning text data with multimedia content and providing the aligned text data and multimedia content. For example, the current embodiments relate to an alignment system that may receive text data, such as text data relating to some of the words spoken in the multimedia content, and multimedia content, such as video content. The alignment system may determine which corresponding portions of the text for each portion of the multimedia content, including cases in which the multimedia content includes spoken words that differ from the words recorded in the text data. Moreover, the current embodiments relate to techniques for providing the aligned text and multimedia content to viewers. Furthermore, aligned content may be provided to viewers based on user input from the viewers.

DRAWINGS

These and other features, aspects, and advantages of the present disclosure will become better understood when the following detailed description is read with reference to the accompanying drawings in which like characters represent like parts throughout the drawings, wherein:

FIG. 4 illustrates diagrammatic representations of chapter data and paragraph data, in accordance with an embodiment of the present disclosure;

FIG. 5 is a flow diagram of an exemplary multi-pass process for aligning text of the transcripts with multimedia content, in accordance with an embodiment of the present disclosure;

Figure 1:
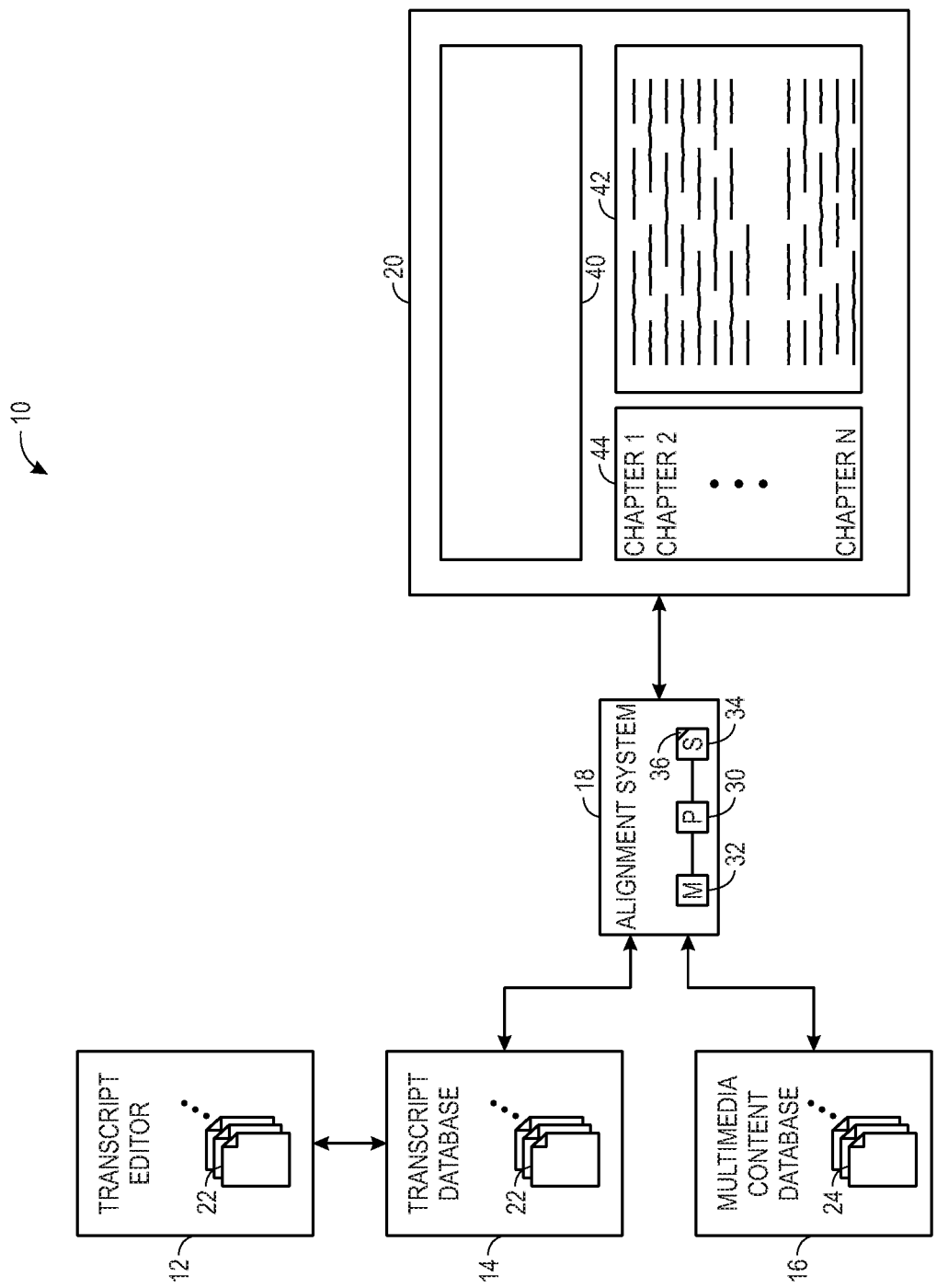
FIG. 1 is a schematic view of a multimedia content and text alignment system, in accordance with an embodiment of the present disclosure.
Figure 12:
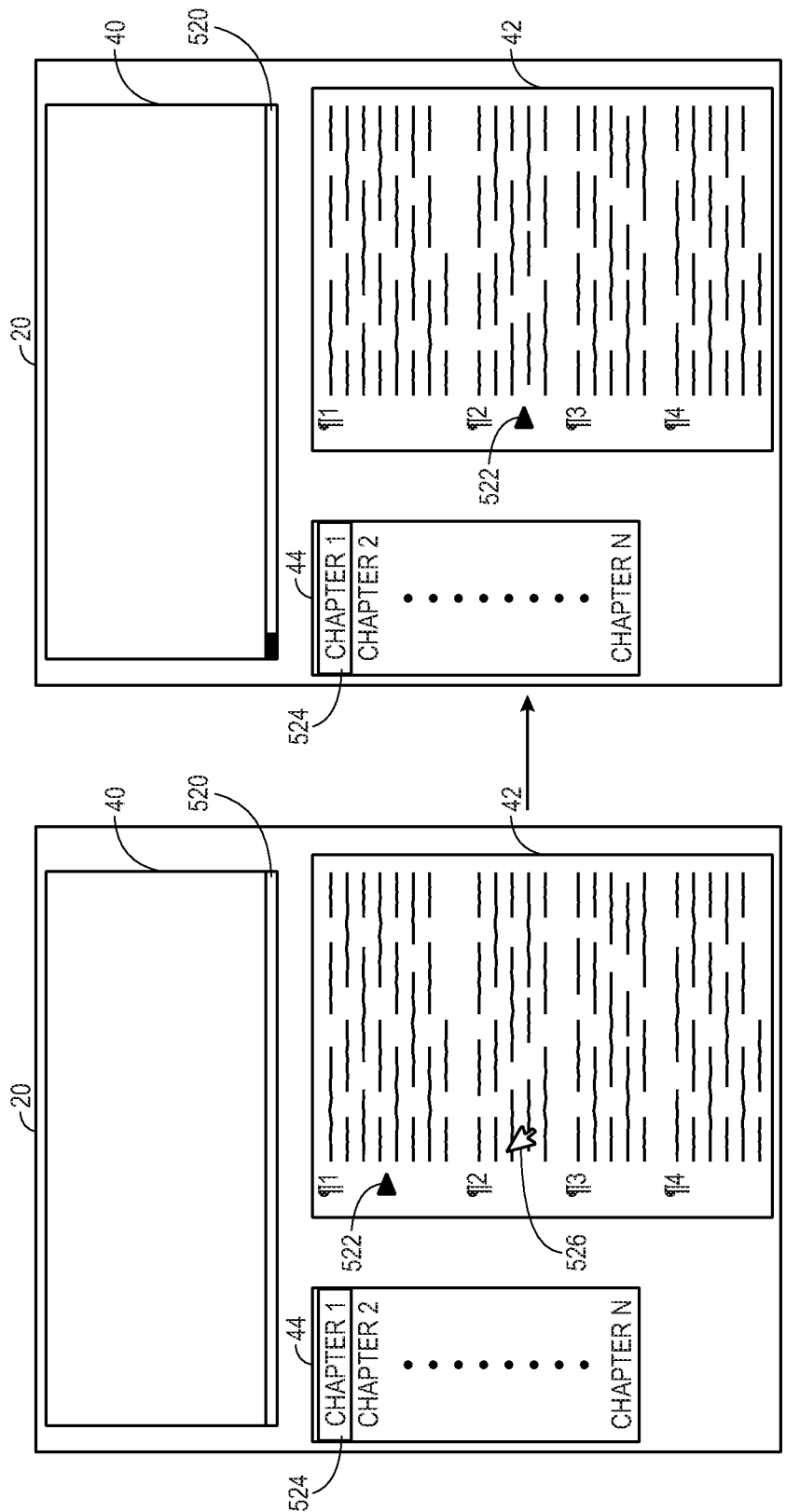
Figure 13:
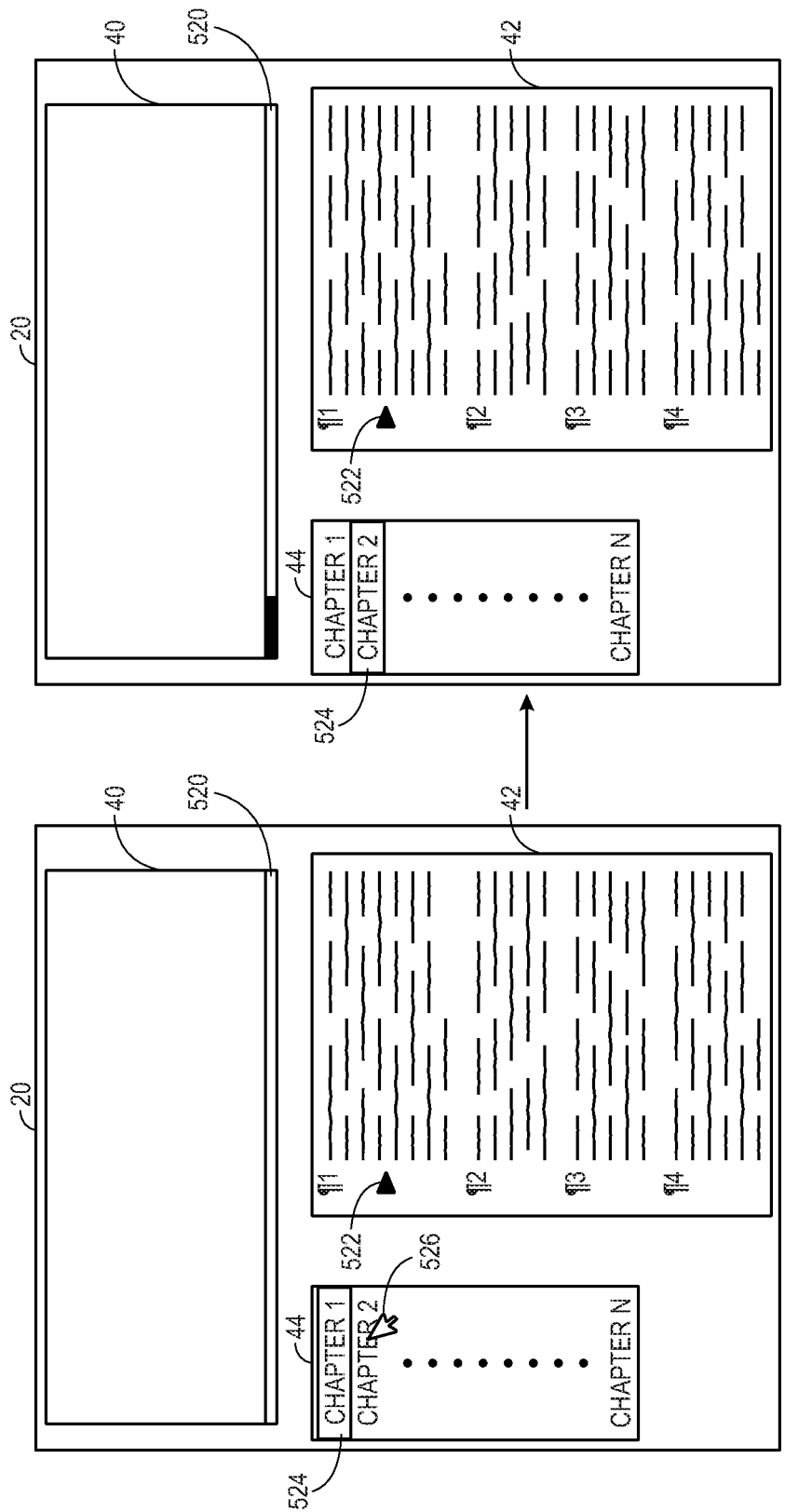

FIG. 12 illustrates schematic diagrams of the viewing system of FIG. 1 receiving user input and providing requested content in response to the user input, in accordance with an embodiment of the present disclosure; and FIG. 13 illustrates schematic diagrams of the viewing system of FIG. 1 receiving user input and providing requested content in response to the user input, in accordance with an embodiment of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, in some instances, audio content included within multimedia content, such as dialogue or other spoken words may differ from text associated with the multimedia content. For example, transcripts of words spoken in the multimedia content may differ from the words spoken in the multimedia content. Moreover, in some cases, such as in cases with large amounts of multimedia content and/or text, manually aligning text with the corresponding portion of the multimedia content can prove onerous. Accordingly, there exists an opportunity for automated determinations of which portions of the multimedia content and text correspond to one another. As described herein, the presently disclosed techniques enable text to be aligned, or synchronized, with multimedia content, such as video content. By automating the process of aligning text with video content rather than performing such alignment manually, significant time savings may be realized. Accordingly, a multimedia content and text alignment system in accordance with the present embodiments may substantially reduce the time it takes to process a tremendous amount of multimedia content and text and align the text with corresponding portions of the multimedia content, especially in cases in which the text differs from the words actually spoken or recorded within the multimedia content.

Turning now to a more detailed discussion of aligning text, such as text from transcripts, with multimedia content, FIG. 1 is a schematic diagram of a multimedia content and text alignment system 10 that may align text with multimedia content and provide the aligned text and multimedia content to viewers. As illustrated, the multimedia content and text alignment system 10 includes a transcript editor 12, transcript database 14, multimedia content database 16, an alignment system 18, and a viewing system 20. As discussed below, the alignment system 18 receives transcripts 22 from the transcript database 14 as well as multimedia content 24 from the multimedia content database 16 and synchronizes or aligns text included in the transcripts 22 with audio content included in the multimedia content 24. Additionally, while only one viewing system 20 is illustrated in FIG. 1, it should be appreciated that in other embodiments, the multimedia content and text alignment system 10 may include one or more viewing systems 20. For example, there may be hundreds, thousands, or even millions of viewing systems 20 in the multimedia content and text alignment system 10. Moreover, it should be noted that in some embodiments, the multimedia content and text alignment system 10 may not include any viewing systems 20.

The transcript editor 12 may enable the generation of the transcripts 22. For example, the transcript editor 12 may include a computer system with which a user may type or otherwise make the transcripts 22. Additionally, the transcript editor 12 may edit the transcripts 22. For example, the transcript editor 12 may enable text of the transcripts 22 to be subdivided, for instance, into chapters (e.g., a subdivision) and paragraphs (e.g., a secondary subdivision). The transcript editor 12, which may be communicatively coupled to the transcript database 14 may send the transcripts 22 to the transcript database 14 to be stored. For example, after a transcript 22 is generated or edited, the transcript 22 may be sent to, and stored within, the transcript database 14.

The transcript database 14, which may also be implemented using a computer system, may include storage, such as one or more non-volatile memory devices capable of storing the transcripts 22. As discussed above, the transcript database 14 may receive the transcripts 22 from the transcript editor 12. Moreover, the transcript database 14 may send transcripts 22 to the transcript editor, for example, to be edited. Furthermore, the transcript database 14 may be communicatively coupled to the alignment system 18 and provide the transcripts 22 to the alignment system 18.

The multimedia content database 16 may store the multimedia content 24 that is aligned with text from the transcripts 22. For example, the multimedia content database may be a computer system that includes one or more non-volatile memory devices capable of storing the multimedia content 24. The multimedia content 24 may include video content and audio content. For example, the multimedia content 24 may include image data, such as video footage, as well as audio data, such as sound. For instance, the audio data may include spoken words that are included in the text of the transcripts. Additionally, the multimedia content database 16 may be communicatively coupled to the alignment system 18 and provide the multimedia content 24 to the alignment system 18. Moreover, as discussed in more detail below, the multimedia content 24 may be segmented. For instance, the multimedia content 24 may be subdivided into chapters, for example, before or after the multimedia content 24 is stored in the multimedia content database 16.

The alignment system 18 receives transcripts 22 from the transcript database 14 and multimedia content 24 from the multimedia content database 16 and aligns text from the transcripts with the multimedia content. For example, in one embodiment, the multimedia content may include a person who is speaking, and the transcript may include text indicating language that the person speaks in the multimedia content 24. In other words, the words spoken in the multimedia content 24 may match the words of the text included in the transcripts 22. In other embodiments, the text from the transcripts 22 and the words spoken in the multimedia content 24 may differ. For example, the multimedia content 24 may be of a speech in which the speaker deviated from the written version of the speech, while the transcript (e.g., transcript 22) for the speech may be the written version of the speech.

The alignment system 18 may include various components that enable the alignment system 18 to perform the techniques described herein. For example, the alignment system 18 includes processing circuitry 30 that is utilized to process data received and sent by the alignment system 18. For example, the processing circuitry 30 may be operably coupled to memory 32 and storage 34 to perform various programs or algorithms, such as an application 36 stored on the storage 34. Such programs or instructions executed by the processing circuitry 30 may be stored in any suitable article of manufacture that includes one or more tangible, computer-readable media at least collectively storing the instructions or routines, such as the memory 32 and the storage 34. The memory 32 and the nonvolatile storage 34 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processing circuitry 30 to enable the alignment system 18 to perform the techniques described herein. For example, the processing circuitry may execute the application to receive multimedia content 24 from the multimedia content database 16, transcripts 22 from the transcript database 14, and requests from the viewing system 20. Moreover, the processing circuitry may execute the application 36 to align text from the transcripts 22 with the multimedia content 24. Additionally, the processing circuitry 30 may include one or more general purpose microprocessors, one or more application specific processors (ASICs), one or more field programmable logic arrays (FPGAs), or any combination thereof.

The viewing system 20 may receive aligned multimedia content and text from the alignment system 18 and provide the aligned multimedia content and text, for example, via a display. The viewing system 20 may be an electronic device, such as a desktop computer, laptop computer, tablet computer, smart phone, and the like. Additionally, the viewing system 20 may be a television. The aligned multimedia content and text may be provided over the internet to the viewing system 20. For example, the illustrated embodiment of the viewing system 20 may depict a user interface associated with a webpage or a mobile application that may be accessed via the viewing system 20. For instance, the viewing system 20 may include a multimedia panel 40 in which the multimedia content 24 may be displayed. The viewing system 20 may also include a text panel 42 in which text from the transcripts 22 is provided. Text that corresponds to a particular portion of the multimedia content 24 may be indicated. For example, in an embodiment in which the multimedia content 24 comprises a video, as the video plays, portions (e.g., paragraphs, sentences, words) of the text displayed in the text panel 42 that are aligned with a currently playing portion of the video may be indicated.

The viewing system 20 may also include a chapter list 44, which may indicate the chapters associated with the multimedia content 24 being displayed via the multimedia panel 40. Furthermore, the chapter list 44 may indicate (e.g., via highlighting, color-coding, etc.) which chapter of the multimedia content 24 is being played.

The viewing system 20 may also receive user input regarding which multimedia content 24, portion of the multimedia content 24, transcript 22, or portion of a transcript 22 to display. For example, as discussed below with respect to FIGS. 10-13, a user may provide input as to a chapter, part of a video, or text the user desired to have displayed. For instance, if a user selects a specific portion of a video included in the multimedia content 24, the multimedia panel 40 may provide the indicated portion of the multimedia content 24, indicate via the chapter list 44 which chapter the selected portion of the video is in, and indicate the text of the transcripts 22 that corresponds to the selected portion of the multimedia content 24.

Figure 2:
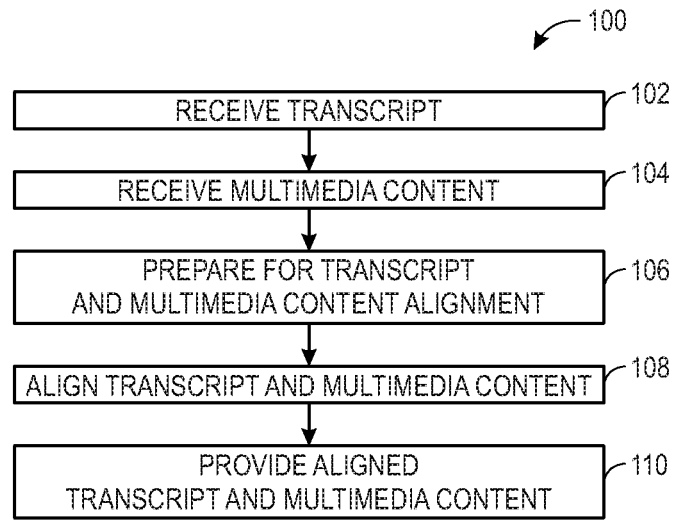
FIG. 2 is a flow diagram illustrating a process for providing aligned multimedia content and transcripts, in accordance with an embodiment of the present disclosure.

Keeping the discussion of FIG. 1 in mind, FIG. 2 is a flow diagram of a process 100 for providing aligned transcripts and multimedia content 24. The process 100 may be implemented via the processing circuitry 30 of the alignment system 18 by executing the application 36. As discussed below, the process 100 generally includes receiving a transcript 22 (process block 102), receiving multimedia content 24 (process block 104), preparing to align the transcript 22 and the multimedia content 24 (process block 106), aligning the transcript 22 and the multimedia content 24 (process block 108), and providing the aligned transcript and multimedia content (process block 110). Moreover, while the process 100 is described below in one order, it should be noted that, in other embodiments, the process 100 may be performed in a different order.

At process block 102, the alignment system 18 may receive a transcript 22. For example, the transcript 22 may be transcript 22 that is stored on the transcript database 14, and the alignment system 18 may receive the transcript 22 from the transcript database 14.

At process block 104, the alignment system 18 may receive the multimedia content 24. For instance, the alignment system 18 may receive the multimedia content 24, which may include video content, from the multimedia content database 16 of the multimedia content and text alignment system 10.

Figure 3:
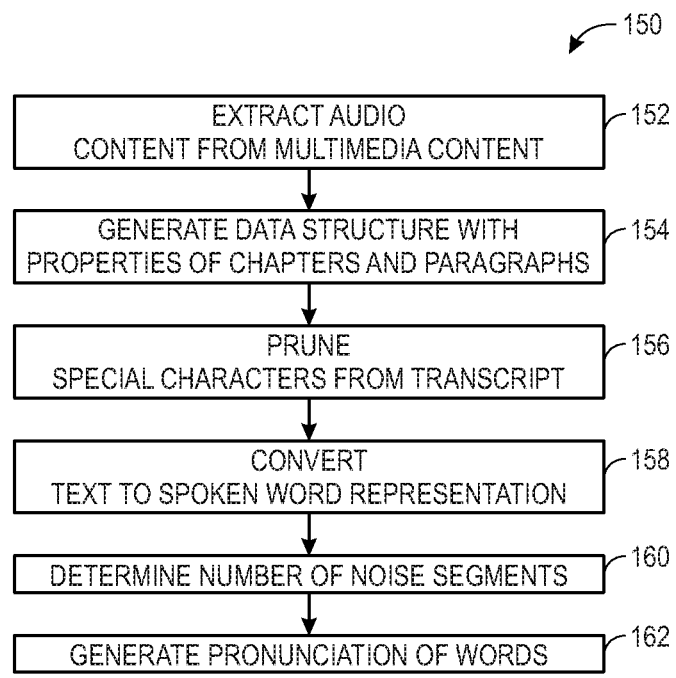
FIG. 3 is a flow diagram of an exemplary process for preparing to align multimedia content with transcripts, in accordance with an embodiment of the present disclosure.

At process block 106, the alignment system 18 may prepare to align the transcript 22 and the multimedia content 24. To further elaborate on how the alignment system 18 prepares content for alignment, FIG. 3 is provided. In particular, FIG. 3 is a flow diagram of an exemplary process 150 for preparing to align multimedia content 24 with transcripts 22. As with the process 100, the process 150 may be performed by the alignment system 18 by the processing circuitry 30 executing the application 36. Additionally, while operations of the process 150 are described below in one order, it should be noted that, in other embodiments, the process 150 may be performed in a different order.

At process block 152, the alignment system 18 may extract audio content from the multimedia content 24. For example, the multimedia content 24 may include image data corresponding to video and audio data corresponding to sound in the video. The alignment system 18 may extract the audio data from the multimedia content 24, and as discussed below, may utilize the audio data to align the text of the transcripts 22 with the multimedia content 24.

At process block 154, the alignment system 18 may generate a data structure that include properties of chapters and paragraphs of the transcripts 22. For example, as discussed above, the multimedia content 24 and transcripts 22 may be divided into chapters. These chapters may correspond to one another. For instance, the audio data (e.g., spoken words) of chapter 23 of the multimedia content 24 may correspond to chapter 23 of a transcript for the multimedia content 24. Accordingly, some properties for a chapter may be defined. For example, a starting time and ending time for a chapter may be known. However, other properties may not be known but may be determined while the multimedia content 24 is aligned with the transcripts 22.

Turning to FIG. 4, which includes diagrammatic representations of data, such as chapter data 200 and paragraph data 202. The chapter data 200 and paragraph data 202, for example, may be data objects that include various attributes. For instance, the chapter data 200 may include a chapter identifier 204 that identifies which chapter a particular chapter is. The chapter data 200, as illustrated also includes a start time 206 and end time 208, which respectively indicate playback times (e.g., times within a corresponding video) that the chapter begins and ends at. The chapter data 200 also includes a duration 210, which may be the difference between the start time 206 and end time 208. Additionally, the chapter data 200 may include a paragraph indicator 212, which indicates the paragraphs that are included within a particular chapter.

The paragraph data 202 may include a paragraph identifier 220 that indicates which paragraph the paragraph data 202 pertains to. The paragraph data 202 may also include various data regarding text included in the paragraph, such as original text data 222, pruned text data 224, and expanded text data 226. The original text data 222 includes the text of the transcript 22 as retrieved from the transcript database 14. The pruned text data 224 includes a portion of the original text data 222. For example, as discussed below, special characters may be removed, or pruned, from the original text data 222, and the resulting text may be stored as the pruned text data 224. The expanded text data 226 may indicate text from the pruned text data 224 converted to a spoken word format that may be utilized to align transcripts 22 with the multimedia content 24.

Continuing with the discussion of the paragraph data 202, the paragraph data 202 may also include a start time indicator 228, which indicates a time that playback of the paragraph begins. The time indicated by the start time indicator 228 may be determined during alignment of a paragraph with the multimedia content 24. Additionally, the paragraph data may include an alignment indicator 230 that indicates whether a particular paragraph has been aligned with the multimedia content 24. In other words, the alignment indicator 230 indicates whether the portion of the multimedia content 24 that corresponds to a particular paragraph has been identified.

In some cases, paragraphs may be manually aligned. For example, a user may manually align text, such as a paragraph from a chapter of a transcript 22, to a corresponding portion of the multimedia content 24. A manual start time indicator 232 may indicate the manually selected start time, and a manual alignment indicator 234 indicates whether a particular paragraph has been aligned manually. The paragraph data 202 also includes an end time indicator 236, which indicates when the paragraph ends. Furthermore, the paragraph data 202 may include a confidence indicator 238 that indicates the level of confidence of a determined alignment between a given paragraph and a portion of the multimedia content 24. For example, the confidence indicator 238 may indicate during which particular portion of an alignment process (e.g., process block 108 of FIG. 2) a particular paragraph was determined to correspond to a particular portion of the multimedia content 24.

The paragraph data 202 may also include a noise segment indicator 240, which may indicate a number of segments within a paragraph that correspond to noises such as laughter, applause, or other non-speech noise within a paragraph. Moreover, the paragraph data 202 may include a word list 242 that indicates each word included in the paragraph. Additionally, the paragraph data 202 may include a start offset indicator 244 that indicates an amount of time between the starting time of the paragraph and a first phrase (e.g., a string of words) that have been matched to the multimedia content 24. For example, if a portion of the multimedia content 24 corresponding to the first several words of a paragraph has been determined (e.g., during alignment of the transcripts 22 and the multimedia content 24), the start offset indicator 244 may be zero, whereas if a string of words that occurs later in the paragraph is the earliest string of words in the paragraph to be determined to correspond to a portion of the multimedia content, the alignment system 18 may estimate an amount of time from that beginning of the paragraph at which the string of words occurs. In such a case, the start offset indicator 244 may be estimated, for instance, by multiplying a default amount of time per word (e.g., as indicated by a default word duration identifier 246) by the number of words from the beginning of the paragraph until the first word in the string.

Furthermore, the paragraph data 202 may include a list of phrases 248 of words within the paragraph that will be searched for in the audio data to determine which portion of the multimedia content 24 the paragraph data 202 pertains to. The paragraph data 202 may also include a result list 250 that includes the string or phrases of words of the paragraph that have been matched to audio data of the multimedia content 24. For instance, as the alignment system 18 processes transcripts 22 and the multimedia content 24 to align the transcripts 22 and the multimedia content 24, the alignment system 18 may update the result list 250 to indicate which strings of words within the paragraph have been determined to be aligned with the multimedia content 24.

Returning to FIG. 3, at process block 156, the alignment system 18 may prune special characters from the text of the transcript 22. For example, among other things, symbol characters may be removed from the original text data 222 of each paragraph to produce the pruned text data 224, which may include words from a particular paragraph with limited amounts of punctuation. For instance, the alignment system 18 may remove parentheses, colons, semi-colons, brackets, question marks, exclamation points, and other characters from the original text data 222.

At process block 158, the alignment system 18 may convert text to spoken word representations. For example, numbers stored in numerical form (e.g., 55) may be converted to spoken word representations, such as text (e.g., fifty-five). As another example, the dollar sign ($) may be converted to the word "dollars" and placed after a number that is also converted to text. The converted text, along with other text, may be included in the expanded text data 226 of each paragraph in the chapter.

At process block 160, the alignment system 18 may determine the number of noise segments associated with a particular chapter. As described above, the noise segments may correspond to portions of audio content during which noise other than spoken words are included. For example, noise segments may include laughter, applause, or other non-speech noise, such as inaudible sounds.

At process block 162, the alignment system 18 may generate a pronunciation for each word of the paragraph and add the word to a dictionary (e.g., included in the memory 32 or the storage 34). For example, the alignment system 18 may utilize a grapheme-to-phoneme model to convert a text representation of the words of the paragraph into phonetic representations of the words. The alignment system 18 may use the phonetic representations to determine whether portions of the paragraph correspond to portions of the multimedia content 24. For example, the alignment system 18 may analyze the audio content of the multimedia content 24 to determine words included in the audio content. By using data indicative of how the words in the paragraphs would be pronounced, the alignment system 18 may determine whether words in the paragraph correspond to a portion of the multimedia content 24.

Returning to FIG. 2, the alignment system 18 may align a transcript 22 and multimedia content 24 at process block 108 and provide aligned transcript and multimedia content at process block 110. To help explain how the alignment system 18 may align text, such as text from a transcript 22, with multimedia content 24, FIG. 5 is provided. In particular, FIG. 5 depicts a flow diagram of an exemplary process 280 for aligning text of the transcripts 22 with the multimedia content 24. The process 280 may be performed by the processing circuitry 30 of the alignment system 18 by executing the application 36. Additionally, while the process 280 is described in one order below, it should be noted that, in other embodiments, the process 280 may be performed in a different order.

The process 280 generally includes performing a first pass (process block 282), performing a second pass (process block 284), performing a third pass (process block 286), and storing alignment data, such as chapter data 200 and paragraph data 202 that indicates an alignment between text of the transcripts 22 with the multimedia content 24 (process block 288). Before continuing to discuss the process 280 in more detail, it should be noted that the first pass may be referred to as a "higher specificity" pass or search, the second pass may be referred to as a "lower specificity" pass or search, and the third pass may be referred to as an "unaligned paragraph" pass or search. During each of these passes, the alignment system 18 works to determine which portions of the multimedia content 24 that text of the transcripts 22 corresponds to. For example, as described below, string of words included in the paragraphs may be matched with identified words in the audio content of the multimedia content 24. For example, the higher specificity pass may utilize strings of words that include more words than the lower specificity pass or an equal number of words as the lower specificity pass. The lower specificity pass may utilize strings of words that include an equal number of words than the higher specificity pass or fewer words than the higher specificity pass. Additionally, as discussed below, paragraphs of text for which a corresponding portion of the multimedia content 24 is not determined during the higher specificity pass or the lower specificity pass may be aligned with the multimedia content 24 during the unaligned paragraph pass. With this in mind, FIGS. 6-9 are provided to provide more detail regarding the passes that may be performed while the process 280 is executed.

Figure 6:
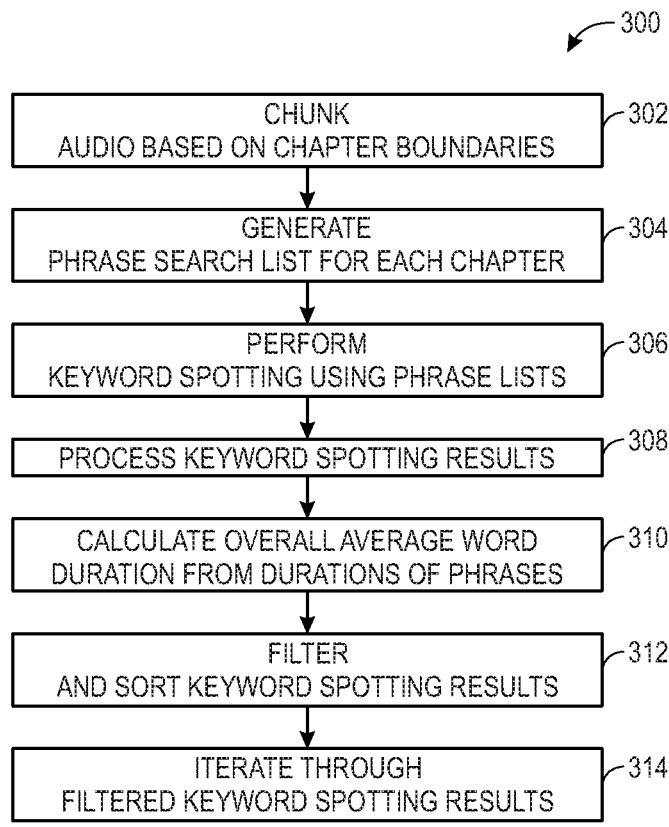
FIG. 6 is a flow diagram of an exemplary process for performing the first pass of the process depicted in FIG. 5, in accordance with an embodiment of the present disclosure.

FIG. 6 is a flow diagram of an exemplary process 300 for performing the higher specificity pass. In other words, FIG. 6 provides a flow diagram for performing process block 282 of FIG. 5. The process 300 may be performed by the processing circuitry 30 of the alignment system 18 be executing the application 36. Additionally, it should be noted that, in some embodiments, the process 300 may be performed in an order different than the order described below. Furthermore, it should be noted that the process 300 may be performed for each chapter of a transcript simultaneously or nearly simultaneously. For example, the process 300 may be performed in parallel for each chapter included in a transcript. Bearing this in mind, at process block 302, the alignment system 18 may chunk, or divide, the audio of each chapter based on the boundaries of the chapter. For instance, the alignment system 18 may divide a larger amount of audio data pertaining to an entire chapter into several pieces of data (e.g., one data file for each chapter) based on the start time 206 and end time 208 included in the chapter data 200. At process block 302, the alignment system 18 may also generate phonemes from the audio content.

At process block 304, the alignment system 18 may generate a phrase search list for each chapter. The phrase search list may include strings, or phrases of words (and phonemes associated with the words) in the paragraph data 202 of a particular chapter. For example, if the phrase search list includes phrases of words that are five words long, for a paragraph that includes ten words, the phrases may include:

1, 2, 3, 4, 5;
2, 3, 4, 5, 6;
3, 4, 5, 6, 7;
4, 5, 6, 7, 8;
5, 6, 7, 8, 9; and
6, 7, 8, 9, 10, where the numbers are representative of words within the phrase based on the numerical position of the word within the string. As shown in the example, the phrase may be windowed across a set of words in the paragraph based on a window size of five words (or any other number of words). Additionally, it should be noted that the phrases may include words from several paragraphs within a chapter. Furthermore, varying lengths of phrases may be included in the phrase search list. For instance, in some embodiments, multiple iterations of the high specificity pass or portions thereof may be performed. For example, in an embodiment in which three different levels of specificity are examined during the high specificity pass, the phrase search lists that are generated and used for keyword spotting may include phrases of different numbers of words. For instance, in one embodiment, in a first iteration, the phrase search lists may include phrases of seven words per phrase, in a second iteration, the phrase search lists may include six words per phrase, and in a third iteration, the phrase search list may include phrases that are five words long.

Continuing with the discussion of the process 300, at process block 306, the alignment system 18 may perform keyword spotting using the phrase search list for each chapter. More specifically, the alignment system 18 may analyze the phrase search lists to determine whether strings of words in the phrase search lists match words included in the audio data of the multimedia content 24. For example, the phrase search list may include phonemes for each of the words included in the phrase search list. The alignment system 18 may generate phonemes from the audio data (e.g., by converting the audio data to phonemes) and compare the phonemes of the phrases generated for each chapter from the transcripts 22 to the phonemes generated from the audio data. For example, when the phonemes from a phrase within the phrase search list match (or substantially match) phonemes generated from the audio data (e.g., same phonemes in the same order or greater than or equal to 90% phonemes matched in the appropriate order), the phrases generated from the audio content are determined to include the same words in the same order as phrases generated from the chapter data 200. In other words, the text and video content is considered aligned. Each of the phrases include in the phrase search list for a particular chapter may be compared against the audio data for the chapter.

At process block 308, the alignment system 18 may process the keyword spotting results. In particular, the alignment system 18 may determine a start time, and end time, and a duration for each phrase of the phrase search list that is matched to audio data from the multimedia content 24. For example, the alignment system 18 may determine a start time for a phrase based on a time within the audio content that the phonemes associated with the first word of a phrase from the phrase search list match the phonemes of the corresponding portion of the audio data. Additionally, the alignment system 18 may determine an end time for a phrase based on a time within the audio content that a last word of a phrase from the phrase search list that matches the last word from the phrase from the text data occurs. For example, in a phrase with six words, if word 1 and word 6 of a phrase generated from the chapter data 200 have been determined to match word 1 and word 6 of a phrase from the phrase search list, the alignment system 18 may determine points in time at which word 1 and word 6 occur in the audio content and respectively assign a phrase start time and phrase end time to the text data (e.g., chapter data 200) based on the determined points in time at which word 1 and word 6 are present.

At process block 310, the alignment system 18 may calculate an overall average word duration based on the determined durations for the aligned phrases. For example, the duration of each phrase (e.g., as determined at process block 308) may be added together and divided by the total number of words included in the phrases (e.g., the number of matched phrases multiplied by the number of words per phrase) to determine the overall average word duration. As described below, the overall average word duration may be utilized to determine a value for the start time indicator 228 of the paragraph data 202.

At process block 312, the alignment system 18 may filter the keyword spotting search results to keep phrases from the transcripts 22 that are matched to phrases from the paragraph search list generated from the audio content. Additionally, the alignment system 18 may sort the matched phrases (e.g., based on chapter order (e.g., as indicated by the chapter identifier 204) and paragraph order (e.g., as indicated by the paragraph identifier 220)).

Figure 7:
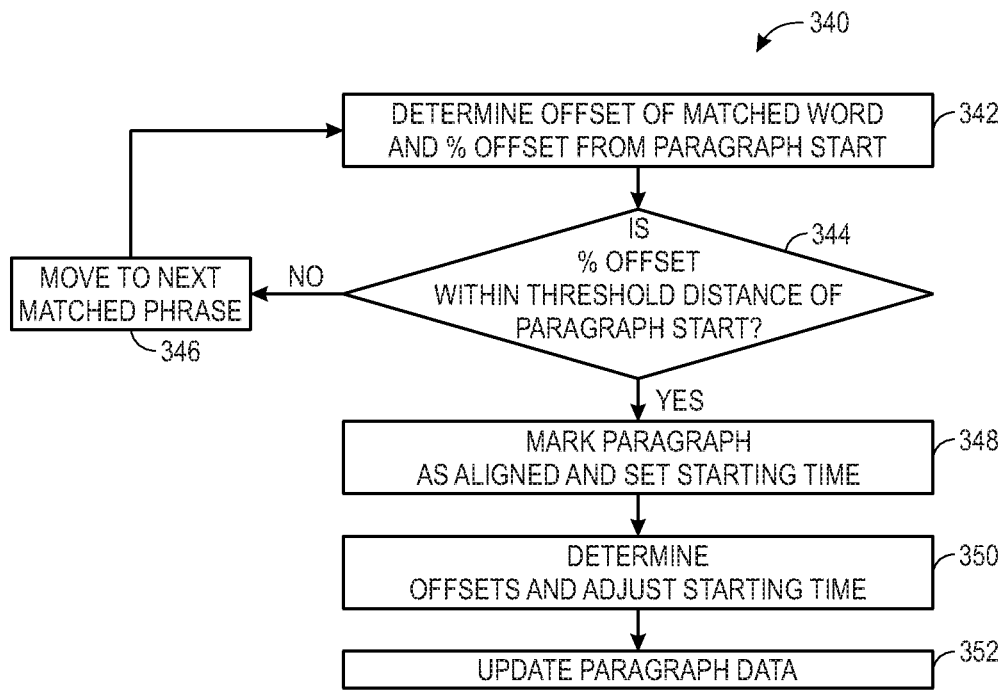
FIG. 7 is a flow diagram of an exemplary process for iterating through aligned content, in accordance with an embodiment of the present disclosure.

Furthermore, at process block 314, the alignment system 18 may iterate through the filtered keyword spotting search results to make various determinations regarding information included in the chapter data 200. With this in mind, FIG. 7 is a flow diagram of an exemplary process 340 for iterating through filtered keyword spotting search results. The process 340 may be performed by the processing circuitry 30 of the alignment system 18 by executing the application 36. Moreover, in other embodiments, the process 340 may be performed in an order different than the order of operations described below with respect to FIG. 7.

At process block 342, the alignment system 18 will determine an offset between a word in a matched phrase (e.g., a first word in the phrase) and the beginning of the paragraph in which the phrase is present. For example, a time within the audio content when a portion of the audio content corresponding to matched phrase may be determined. The offset between the word and the beginning of the paragraph may be a difference between a start time for the paragraph and the time at which the word or phrase that includes that word occurs. For example, the offset may be an amount of time. At process block 342, the alignment system 18 may also determine the offset as a percentage relative to the duration of the paragraph. For example, if a phrase is determined to being halfway through a paragraph, the phrase may be considered to have an offset of fifty percent.

At decision block 344, the alignment system 18 may determine whether the offset (e.g., in percentage relative to the duration of the paragraph) is within a threshold distance from the beginning of the paragraph. For example, the alignment system 18 may determine whether the offset is less than or equal to a predetermined value. More specifically, the threshold may be a predetermined percentage value, such as ten, twenty, thirty, forty, or fifty percent, and the alignment system 18 may determine whether the offset in the form of a percentage is less than or equal to the threshold amount. When the alignment system 18 determines that the offset is not within the threshold amount from the beginning of the paragraph, the alignment system 18, at process block 346 may consider the next matched phrase.

However, if at decision block 344 the alignment system 18 determines that the offset for a phrase is within the threshold distance from the beginning of the paragraph, at process block 348, the alignment system 18 may mark the paragraph as aligned and set a start time for the paragraph in the corresponding paragraph data 202. For example, to set the paragraph as aligned, the alignment system 18 may change a value of the alignment indicator 230 of the paragraph data 202 to indicate that the paragraph of text has been aligned with the multimedia content 24. Additionally, to set a start time for the paragraph, the alignment system 18 may determine the start time of the chapter in which the paragraph occurs (e.g., as indicated by the start time 206 of the chapter data 200) and add an amount of time into the chapter that the matched phrase occurs. In other words, the start time of the paragraph may be set to the time in the audio content in which the corresponding text from the transcripts 22 has been determined to be present.

Additionally, in some embodiments, at process block 348, the alignment system 18 may determine the end time (e.g., a value for the end time indicator 236 of the paragraph data 202) based on the when the last word of a matched phrase occurs (e.g., as determined based on the matching of text data to audio data). The end time for a paragraph may be updated for each phrase of a paragraph. For instance, when the matched phrases are analyzed in order from first appearance to last appearance, At process block 350, the alignment system 18 may determine a start offset for the paragraph being analyzed and adjust the starting time (e.g., as indicated by the start time indicator 228 of the paragraph data 202) based on the start offset. To determine the start offset, the alignment system 18 may determine the number of words from the start of the paragraph that the first word of the matched phrase occurs and multiply the determined number of words by the overall average word duration. For example, if the earliest phrase within a paragraph begins with the seventeenth word of the paragraph, the start offset may be determined by multiplying a number, such as sixteen, by the overall average word duration. A number less than the actual number of words from the start may be utilized (e.g., one less than the number of words from the start of paragraph) so that there is no offset for the first word. In other words, if a word is the $n^{th}$ word in a paragraph, there are n−1 words that occur before the $n^{th}$ word. Accordingly, the offset may only account for n−1 words. To adjust the starting time for the paragraph, the alignment system 18 may subtract the determined start offset from the previous value of the start time.

At process block 352, the alignment system 18 may update the paragraph data 202, which may include storing paragraph data 202 for each paragraph that has been aligned with audio content from the multimedia content 24. Additionally, at process block 352, alignment system 18 may update the confidence indicator 238 for the aligned paragraphs of text to indicate that the paragraphs were aligned during the higher specificity pass of the process 280.

After updating data at process block 352, in some embodiments of the process 340, the alignment system 18 may return to process block 346 to continue analyzing matched phrases until each matched phrase has been processed in accordance with the process 340. Alternatively, the process 340 may be repeated several times until the alignment system 18 has analyzed each matched phrase.

Moreover, in some embodiments, the process 340 may include determining whether a paragraph that includes a matched phrase has been aligned. For instance, when the matched phrases are sorted in order of earliest appearance to latest appearance, once a paragraph has been aligned, the remaining phrases in the paragraph may not be analyzed, which may enable the processing circuitry 30 of the alignment system 18 to more efficiently iterate through the matched phrases. Alternatively, the alignment system 18 may determine the last matched phrase with the aligned paragraph and analyze the last phrase of the paragraph in accordance with the process 340 to determine the end time (e.g., as provided by the end time indicator 236 of the paragraph data 202) for the paragraph that the matched phrase occurs in.

Similarly, when the matched phrases are sorted in order from first appearance to last appearance, moving to the next matched phrase (e.g., process block 346) may include determining whether the next matched phrase occurs within the same paragraph as the phrase determined to not be within the threshold from the beginning of the paragraph. Because the next matched phrase would occur after the previous phrase, the next phrase would also not be within the threshold. Accordingly, at process block 346, the alignment system 18 may move to the next matched phrase that occurs in a different paragraph.

As noted above, in some cases, paragraphs may be manually aligned. For example, a user may be able to manually set a starting time for a paragraph. In other words, a person may set a value of the manual start time indicator 232, and the processes 280 and 300 (as well as exemplary processes depicted in FIG. 8 and FIG. 9 that are discussed below) may account for and/or utilize manually aligned paragraphs. For example, with respect to the process 300 and process 380 of FIG. 8, when a manual start time is associated with a chapter (e.g., a value for the manual start time indicator 232 has been set), the alignment system 18 may alter a value of the manual alignment indicator 234 to indicate that a particular paragraph has been manually aligned. If a paragraph is manually aligned, the alignment system 18 may skip or otherwise not consider the paragraph while performing the processes 280, 300, and 380.

Referring back to FIG. 5, at process block 284, the alignment system 18 may perform the second pass. As discussed below with respect to FIG. 8, performing the second pass may be generally similar to performing the higher specificity pass in several respects. For instance, keyword spotting may be performed using phrases of an equal number of words or fewer words than utilized in the higher specificity pass. Accordingly, the second pass may be referred to as the "lower specificity pass."

Figure 8:
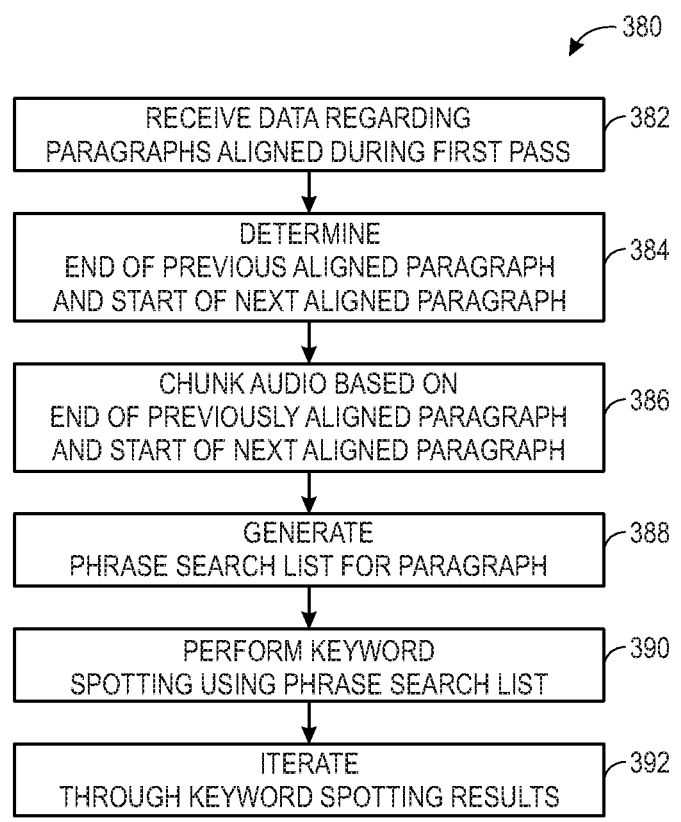
FIG. 8 is a flow diagram of an exemplary process for performing the second pass of the process depicted in FIG. 5, in accordance with an embodiment of the present disclosure.

FIG. 8 is a flow diagram of an exemplary process 380 for performing the lower specificity pass. The process 380 may be performed by processing circuitry 30 of the alignment system 18 by executing the application 36. Additionally, while the process 380 is described in an order below, in other embodiments of the process 380 the operations of the process 380 may be performed in a different order. Moreover, before discussing the process 380 in greater detail, it should be noted that the process 380 may be performed in parallel for each paragraph within a chapter. In other words, each paragraph of a chapter may be analyzed in accordance with the process 380 simultaneously or nearly simultaneously.

At process block 382, the alignment system 18 may receive data (e.g., first alignment information) regarding paragraphs aligned during the first, higher specificity, pass. For example, processing circuitry 30 of the alignment system 18 may receive the paragraph data 202 of the paragraphs determined to be aligned during the higher specificity pass from the memory 32 or the storage 34 of the alignment system 18. The alignment system 18 may also receive data relating to the paragraphs that remain unaligned after the higher specificity pass. Moreover, it should be noted that the data received at process block 382 may include data (e.g., paragraph data 202) for manually aligned paragraphs.

At process block 384, utilizing the received data regarding the previously aligned paragraphs, the alignment system 18 may determine an end time of a previous paragraph (e.g., as indicated by the start time indicator 228 of the chapter data 200) and a start time of the next occurring previously paragraph (e.g., as indicated by the start time indicator 228 of the chapter data 200). In other words, for a paragraph that remains unaligned after the higher specificity pass, the alignment system 18 may determine the end time of an aligned paragraph that occurs before most closely before the unaligned paragraph. The alignment system 18 may also determine the start time of an aligned paragraph that occurs most closely after the unaligned paragraph. Accordingly, by the determining the end time of a previously occurring aligned paragraph and the start time of a subsequent aligned paragraph, a time range for the unaligned paragraph may be determined.

Based on the end time of the previously occurring aligned paragraph and the start time of the subsequent aligned paragraph, at process block 386, the alignment system 18 may chunk, or divide, the audio data. In other words, using the time ranges for the unaligned paragraphs, the alignment system 18 may categorize or divide the audio data using the time ranges.

At process block 388, the alignment system 18 may generate a phrase search list for each paragraph. The phrase search list may include strings, or phrases of words (and phonemes associated with the words) indicated in the paragraph data 202. For example, if the phrase search list includes phrases of words that are three words long, for a paragraph that includes ten words, the phrases may include:

1, 2, 3;
2, 3, 4;
4, 5, 6;
5, 6, 7;
6, 7, 8;
7, 8, 9; and
8, 9, 10, where the numbers are representative of words within the phrase based on the numerical position of the word within the phrase. Varying lengths of phrases may be included in the phrase search list. For instance, in some embodiments, multiple iterations of the lower specificity pass or portions thereof may be performed. For example, in an embodiment in which three different levels of specificity of examined during the lower specificity pass, the phrase search lists that are generated and used for keyword spotting may include phrases of different numbers of words. For instance, in a first iteration, the phrase search lists may include phrases of five words per phrase, in a second iteration, the phrase search lists may include four words per phrase, and in a third iteration, the phrase search list may include phrases that are three words long.

Continuing with the discussion of the process 380, at process block 390, the alignment system 18 may perform keyword spotting using the phrase search list for each paragraph. More specifically, the alignment system 18 may analyze the phrase search lists to determine whether strings of words in the phrase search lists match words included in the audio data of the multimedia content 24. For example, the phrase search list may include phonemes for each of the words included in the phrase search list. The alignment system 18 may generate phonemes from the audio data (e.g., by converting the audio data to phonemes) and compare the phonemes of the phrases generated for each paragraph (e.g., from the expanded text data 226) to the phonemes generated from the audio data. For example, when the phonemes from a phrase within the phrase search list match (or substantially match) phonemes generated from the audio data (e.g., same phonemes in the same order or greater than or equal to 90% phonemes matched in the appropriate order), the phrases generated from the audio content are determined to include the same words in the same order as phrases generated from the paragraph data 202. In other words, the text and video content is considered aligned. Each of the phrases include in the phrase search list for a particular paragraph may be compared against the audio data.

In some embodiments, the alignment system 18 may filter the keyword spotting search results to keep phrases from the transcripts 22 that are matched to phrases from the paragraph search list generated from the audio content. Additionally, the alignment system 18 may sort the matched phrases (e.g., based on paragraph order (e.g., as indicated by the paragraph identifier 220)).

Furthermore, at process block 392, the alignment system 18 may iterate through the filtered keyword spotting search results to make various determinations regarding information included in the chapter data 200, as described above with respect to FIG. 7. For example, the alignment system 18 may determine start times and end times for paragraphs aligned during the second pass as well as update the paragraph data 202 for the paragraphs aligned during the second pass as described above with respect to the process 340 of FIG. 7. More specifically, when iterating through the filtered keyword spotting results, the alignment system 18 may utilize the overall average word length determined during the higher specify pass to determine the start offsets for each paragraph aligned during the second pass in a manner generally similar to the technique described above.

Returning to FIG. 5, at process block 286, the alignment system 18 may perform the third pass. As described below with respect to FIG. 9, during the third pass, the alignment system 18 may align paragraphs that are not aligned during the first and second passes. As such, the third pass may be referred to as an "unaligned paragraph pass."

Figure 9:
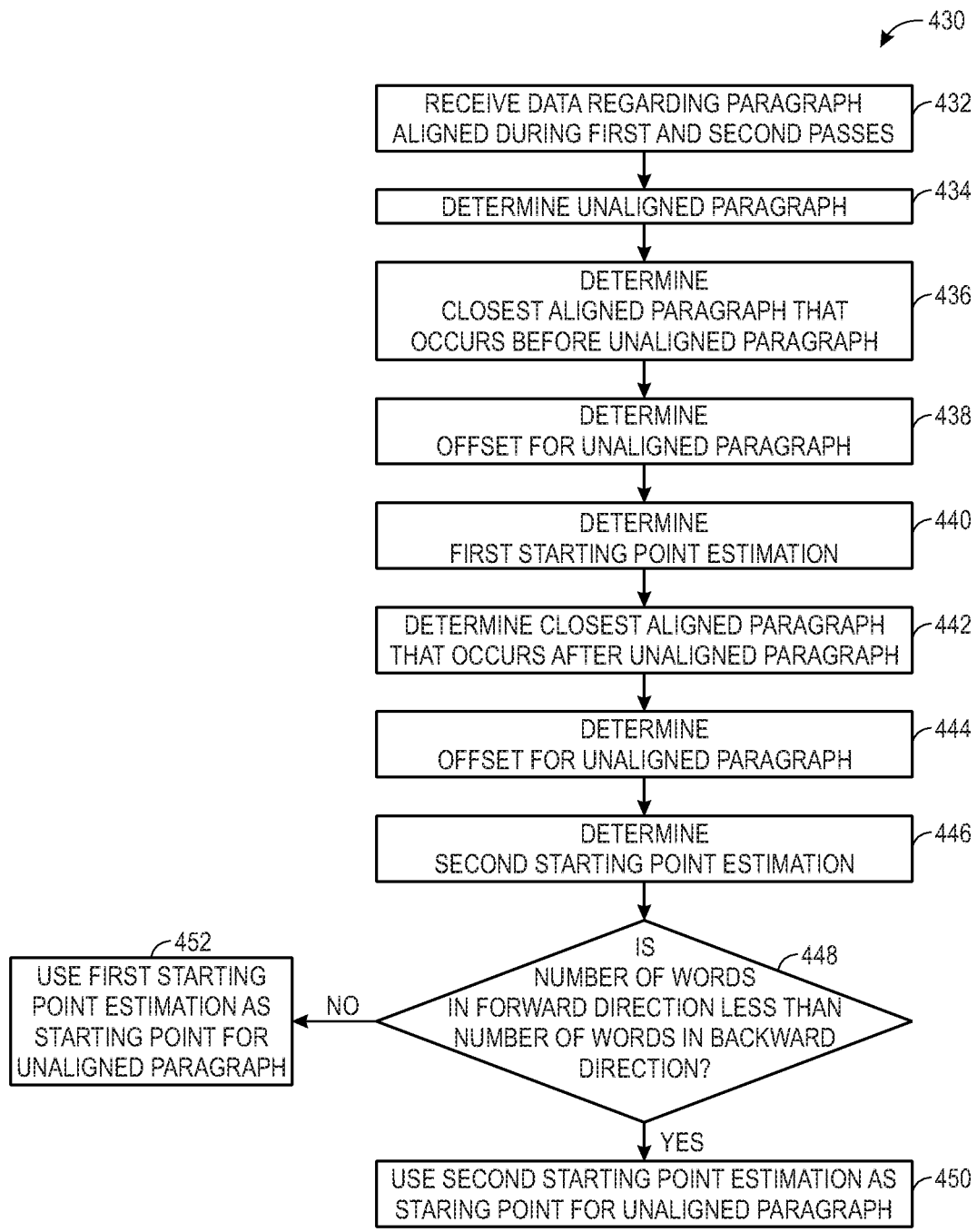
FIG. 9 is a flow diagram of an exemplary process for performing the third pass of the process depicted in FIG. 5, in accordance with an embodiment of the present disclosure.

FIG. 9 is a flow diagram of an exemplary process 430 for performing the third pass of the process 280 of FIG. 5. The process 430 may be performed by the alignment system 18 by the processing circuitry 30 executing the application 36. Additionally, while operations of the process 430 are described below in one order, it should be noted that in other embodiments, the process 430 may be performed in a different order.

At process block 432, the alignment system 18 may receive data regarding the paragraphs aligned during the higher specificity pass (e.g., first alignment information generated from the higher specificity pass) and the lower specificity pass (e.g., second alignment information generated from the lower specificity pass). In other words, the alignment system 18 may receive the paragraph data 202 associated with paragraphs aligned during the first and second passes. Additionally, the alignment system 18 may receive paragraph data 202 for paragraphs that remain unaligned after performing the first pass and the second pass. Moreover, it should be noted that the data received at process block 432 may include data (e.g., paragraph data 202) for manually aligned paragraphs.

Based on the data regarding the previously aligned paragraphs, at process block 432, the alignment system 18 may determine paragraphs are unaligned. For example, the alignment system 18 may determine which paragraphs are unaligned based on the alignment indicator 230 of the paragraph data 202 for each paragraph.

At process block 436, the alignment system 18 may determine the closest aligned paragraph that occurs before an unaligned paragraph determined to be unaligned. For example, the alignment system 18 may determine the aligned paragraph that occurs most immediately before the unaligned paragraph by starting with the paragraph immediately before the unaligned paragraph (e.g., as indicated by the paragraph identifier 220 of the paragraph data 202) and continuing backwards until an aligned paragraph is located. It should be noted that the aligned paragraph that occurs most immediately before the unaligned paragraph may be a manually aligned paragraph.

At process block 438, the alignment system 18 may determine an offset for the unaligned paragraph based on the paragraph data 202 of the aligned paragraph determined to occur most immediately before the unaligned paragraph. More specifically, the offset may be determined by determining the sum of several components of the offset. For example, components of the offset may include a noise offset, a number of words offset, and a paragraphs traversed offset. The noise offset, which may account for breaks in spoken content within the multimedia content 24, may be determined by multiplying a predefined value (e.g., a value defining a default amount of time for noise segments) by the number of noise segments that occur between the end of the unaligned paragraph and the end of the aligned paragraph that immediately precedes the unaligned paragraph. Additionally, it should be noted that the number of noise segments in the paragraph may be calculated by determining the number of noise offsets of the chapter that occur during the time frame determined (e.g., at process block 436) for the unaligned paragraph.

The number of words offset generally accounts for the number of words between the unaligned paragraph and the aligned paragraph determined to occur most immediately before the unaligned paragraph. For example, if the unaligned paragraph is the third paragraph in a chapter, and the aligned paragraph that occurs most immediately before the unaligned paragraph is the first paragraph in the chapter, the alignment system 18 may determine the number of words in the second paragraph (i.e., the number of words between the last word of the first paragraph and the first word of the third paragraph). Additionally, to calculate the number of words offset, the alignment system 18 may multiply the number of words in the second paragraph by a predetermined value for the duration of time per word (e.g., the overall average word duration).

The paragraphs traversed offset accounts for pauses or other delays that may occur in the spoken content when switching paragraphs. To determine the paragraphs traversed offset, the alignment system 18 may determine the number of paragraphs before the unaligned paragraph that the aligned paragraph that most immediately precedes the unaligned paragraph occurs. For instance, in the example of the unaligned paragraph being the third paragraph in a chapter and the aligned paragraph that most immediately precedes the unaligned paragraph being the first paragraph, the alignment system 18 may determine that two paragraphs are traversed (e.g., a transition from the first paragraph to the second paragraph and another transition from the second paragraph to the third paragraph). To determine the paragraphs traversed offset, the alignment system 18 may multiply the number of paragraphs before the unaligned paragraph by a predetermined value, such as a value of time to reflect an amount of time between paragraphs. Furthermore, the alignment system 18 may add the noise offset, number of words offset, and paragraphs traversed offset to determine the offset.

At process block 440, the alignment system 18 may determine a first starting point estimation for the unaligned paragraph. More specifically, the alignment system 18 may determine that first starting point estimation by adding the offset (e.g., the offset determined at process block 438) to a starting point of the unaligned paragraph, which may be defined as the end time of the aligned paragraph that most immediately precedes the unaligned paragraph. In other words, the first starting point estimation provides an estimate of when the unaligned paragraph begins based on the number of noise segments, words, and paragraphs between the unaligned paragraph and the aligned paragraph that most immediately precedes the unaligned paragraph.

In addition to determining an estimated starting point (e.g., the first starting point estimation) of the unaligned paragraph based on the most immediately preceding aligned paragraph, another estimated starting point may be determined based on the aligned paragraph that occurs most immediately after the unaligned paragraph. Accordingly, at process block 442, the alignment system 18 may determine the aligned paragraph that occurs most immediately after the unaligned paragraph. For example, the alignment system 18 may analyze paragraphs starting with the first paragraph that occurs after the unaligned paragraph (e.g., based on the paragraph identifier 220) until an aligned paragraph is identified (e.g., as indicated by the alignment indicator 230). Furthermore, it should be noted that the aligned paragraph that occurs most immediately after the unaligned paragraph may be a manually aligned paragraph.

At process block 444, the alignment system 18 may determine an offset of the unaligned paragraph. The offset may be determined in generally the same manner as described above with respect to determining the first starting point estimation except that the alignment system 18 operates by proceeding forwards through the content rather than backwards. For example, the noise offset may account for the amount of noise segments between the end of the unaligned paragraph and the beginning of the aligned paragraph that most immediately follows the unaligned paragraph. The number of words offset may account for the number of words between the last word of the unaligned paragraph and the first word of the aligned paragraph that most immediately follows the unaligned paragraph. Additionally, the paragraphs traversed offset may account for the number of paragraphs between the unaligned paragraph and the aligned paragraph that most immediately follows the unaligned paragraph, inclusive of the aligned paragraph that most immediately follows the unaligned paragraph.

At process block 446, the alignment system 18 may determine a second starting point estimation for the unaligned paragraph. For instance, the alignment system 18 may subtract the offset determined at process block 444 from the starting point of the aligned paragraph that most immediately follows the unaligned paragraph.

The alignment system 18 may also determine which of the first starting point estimation and the second starting point estimation to use as the starting point for the unaligned paragraph. For example, at decision block 448, the alignment system 18 may determine whether the number of words in a forward direction is less than a number of words in a backward direction. In other words, the alignment system 18 may determine whether there are fewer words between the end of the unaligned paragraph and the beginning of the aligned paragraph that most immediately follows the unaligned paragraph compared to the number of words between the beginning of the unaligned paragraph and the end of the aligned paragraph that most immediately precedes the unaligned paragraph. If the alignment system 18 determines that there are fewer words between the unaligned paragraph and the paragraph that follows that aligned paragraph that most immediately follows the unaligned paragraph, at process block 450, the alignment system 18 may utilize the second starting point estimation as the starting point for the unaligned paragraph. For example, the alignment system 18 may set the value of the start time indicator 228 of the paragraph data 202 of the unaligned paragraph to be equal to the second starting point estimation.

However, if the alignment system 18 determines that there is an equal number of words or more words between the between the unaligned paragraph and the paragraph that follows that aligned paragraph that most immediately follows the unaligned paragraph, at process block 452, the alignment system 18 may use the first starting point estimation as the starting point of the unaligned paragraph. More specifically, the alignment system 18 may set the value of the start time indicator 228 of the paragraph data 202 of the unaligned paragraph to be equal to the first starting point estimation.

The process 430 may include additional operations. For example, after a starting point is determined for a paragraph, the alignment system 18 may indicate that paragraph is aligned (e.g., by updating a value of the alignment indicator 230 of the paragraph data 202 for the paragraph). Additionally, it should be noted that the process 430 or portions thereof may be repeated until each paragraph in has been determined to be aligned.

Returning to FIG. 5, at process block 288, the alignment system 18 may store data regarding the alignment of the transcripts 22 and the multimedia content 24. For example, the chapter data 200 and paragraph data 202 for the chapters and paragraphs that have been aligned may be stored, for example, in the storage 34 of the alignment system 18. In other embodiments, data reflecting the alignment between the transcripts 22 and the multimedia content 24 may be stored in another database or form of storage (e.g., non-volatile memory) that is communicatively coupled to the alignment system 18. Additionally, it should be noted that data regarding manually aligned paragraphs (e.g., paragraph data 202) may be included in the data regarding the alignment of the transcripts 22 and the multimedia content 24.

Referring back to FIG. 2, the alignment system 18 may provide the aligned transcripts 22 and multimedia content 24, for example, via the viewing system 20. For example, the viewing system 20 may be included as part of a computer system (e.g., desktop computer, laptop computer, tablet computer, smartphone) or television that a user may utilize to view the multimedia content 24 with the text of the transcripts 22. For example, the alignment system 18 may provide the aligned transcripts 22 and multimedia content 24 via the internet to the viewing system.

Figure 10:
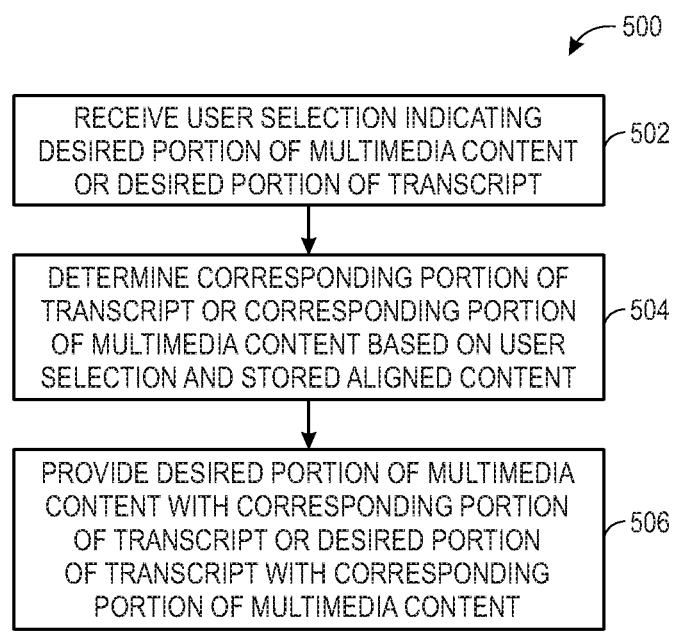
FIG. 10 is a flow diagram of an exemplary process for providing aligned content based on a request from the viewing system of FIG. 1, in accordance with an embodiment of the present disclosure.

On a similar note, a user of the viewing system 20 may request a particular portion of the multimedia content 24 or transcripts 22 to view, and the alignment system 18 may provide the requested multimedia content 24 and/or transcripts 22 to the viewing system 20. Bearing this in mind, FIG. 10 is a flow diagram of an exemplary process 500 for providing aligned content based on a request from the viewing system 20. The process 500 may be performed by the processing circuitry of the alignment system 18 by executing the application 36.

At process block 502, the alignment system 18 may receive an indication of a user selection indicating a desired portion of the multimedia content 24 or a desired portion of the transcripts 22, or both. For example, the user may utilize an input device, such as a keyboard, mouse, touchscreen, or other form of input device to select a portion of the multimedia content 24, transcripts 22, or both that the user wants to view.

At process block 504, the alignment system 18 may determine a corresponding portion of the transcript 22, corresponding portion of the multimedia content 24, or both based on the user selection and the stored aligned content. For example, based on the user input, the alignment system 18 may determine which portion of the multimedia content 24 the user wants to watch. Using the aligned content data (e.g., as generated by performing the process 280), the alignment system 18 may also determine the corresponding portion of text in the transcript 22. Similarly, if the user indicates a portion of text (e.g., via the text panel 42), the alignment system 18 may determine a portion of the multimedia content 24 that corresponds to the selected portion of text based on the aligned content data. And, as a further example, if the user input is indicative of a chapter (e.g., based on a user interaction with the chapter list 44), the alignment system 18 may determine a chapter based on the input as well as determine the location of the chapter within the transcript 22 and the multimedia content 24.

At process block 506, the alignment system 18 may provide the desired portion of the multimedia content 24 with a corresponding portion of the transcript 22, the desired portion of the transcript 22 with a corresponding portion of the multimedia content 24, or a desired portion of the transcript 22 and the multimedia content 24.

Figure 11:
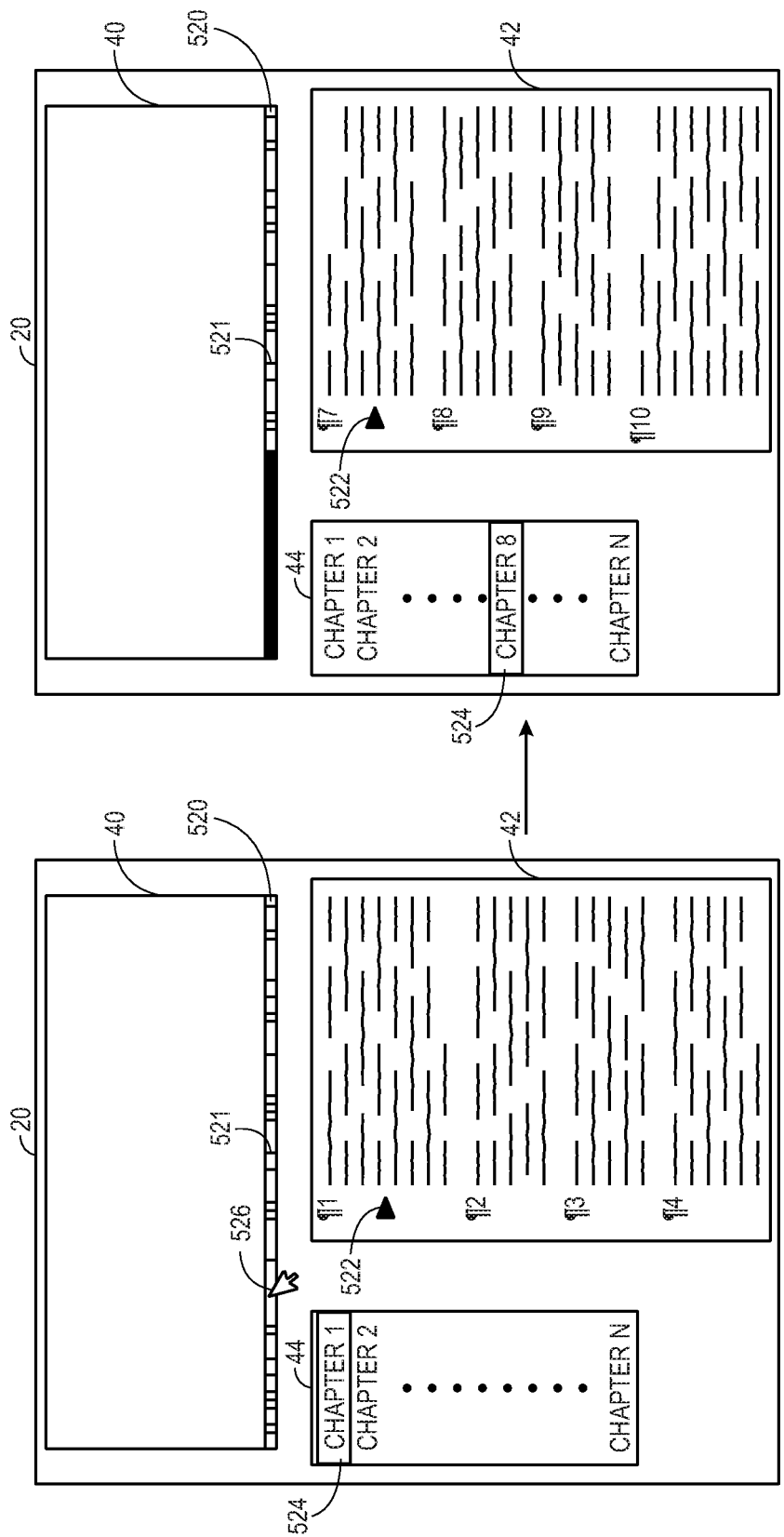
FIG. 11 illustrates schematic diagrams of the viewing system of FIG. 1 receiving user input and providing requested content in response to the user input, in accordance with an embodiment of the present disclosure.

With the discussion relating to process block 502 in mind, FIGS. 11-13 are provided to illustrate various types of user interactions that may occur at the viewing system 20. More specifically, FIG. 11 illustrates schematic diagrams of the viewing system 20 in which a request to view a particular portion of the multimedia content 24 is made. FIG. 12 illustrates schematic diagrams of the viewing system 20 relating to a request related to the transcripts 22, and FIG. 13 illustrates schematic diagrams of the viewing system 20 pertaining to a request related to both the multimedia content 24 and the transcripts 22. In each of FIGS. 11-13, a progress bar 520 indicates which portion of the multimedia content 24 is currently being provided via the multimedia panel 40. The positions of chapters may also be indicated by chapter indicators 521 included in the progress bar 520. Additionally, a current paragraph indicator 522 indicates which paragraph corresponds to the portion of the multimedia content 24 that is being provided via the multimedia panel 40. Moreover, a current chapter indicator 524 indicates which chapter the currently playing multimedia content 24 and the current paragraph (e.g., as indicated by the current paragraph indicator 522) belong to. As the multimedia content 24 changes, the progress bar 520, current paragraph indicator 522, and the current chapter indicator 524 accordingly.

As one example of a user interaction, in FIG. 11 a user may select (e.g., as depicted via an icon 526) a portion of the progress bar 520 that indicates what portion of the multimedia content 24 is being provided via the multimedia panel 40. Additionally, the progress bar 520 may include the chapter indicators 521 that indicate where chapters occur within the multimedia content 24. A user may select a location within the progress bar 520 to indicate a desire to watch the portion of the multimedia content 24 associated with the selected location of the progress bar 520. In response to receiving a request to view a specific portion of the multimedia content 24, the alignment system 18 may provide the requested portion of the multimedia content 24 via the multimedia panel 40, indicate the corresponding text of the transcript 22 via the text panel 42, and indicate which chapter the multimedia content 24 shown in the multimedia panel 40 and indicated text in the text panel 42 belongs to via the current chapter indicator 524. For instance, as illustrated in FIG. 11, in response to receiving an indication to present content in the sixth chapter (as indicated by the chapter indicators 521), the alignment system 18 may provide the requested portion of the multimedia content 24 via the multimedia panel 40, indicate that the multimedia content 24 shown in the multimedia panel 40 and text included in the text panel 42 belong to chapter six via the current chapter indicator 524, and indicate that the words being spoken in the multimedia content 24 correspond to the text of the seventh paragraph of chapter six.

As another example, in FIG. 12, a user may select (e.g., as depicted via the icon 526) a portion of the text provided via the text panel 42. For instance, the user may select a paragraph to indicate which portion of the multimedia content the user desires to have provided via the multimedia panel 40. More specifically, each paragraph provided in the text panel 42 may be selectable, and the user may select a specific paragraph (e.g., paragraph two) to indicate a portion of the multimedia content 24 that the user wishes to view. Moreover, as indicated by the progress bar 520, in response to receiving an indication via a selection of a portion of the text of the text panel 42, the alignment system 18 may provide the portion of the multimedia content 24 corresponding to the selected portion of the text via the multimedia panel 40. Additionally, the content selected portion of the text, which corresponds to the multimedia content 24 presented via the multimedia panel 40, may be indicated (e.g., highlighted, color-coded, indicated with an arrow, or indicated via another form of visual indication). Furthermore, the chapter that the portion of the multimedia content 24 and the transcript 22 are included in may be indicated via the current chapter indicator 524.

Furthermore, as yet another example, in FIG. 13, the user may select (e.g., as depicted via the icon 526) a chapter (e.g., chapter two) via the chapter list 44 to indicate the chapter of the multimedia content 24 and a corresponding transcript 22 that the user desires to have displayed via the multimedia panel 40 and the text panel 42, respectively. For example, the chapters of the chapter list 44 may be selectable, and the user may indicate which chapter of content (e.g., multimedia content 24 and a corresponding transcript 22) that the user wishes to view via the viewing system 20. In response to receiving an indication of a chapter via the chapter list 44, the alignment system 18 may provide a corresponding portion of the multimedia content 24 (e.g., via the multimedia panel 40) as well as indicate a portion of the text (e.g., via the text panel 42) associated with the chapter. For example, the portion of the multimedia content 24 presented may correspond to the beginning of the chapter, and the portion of the text indicated may be the first paragraph of the chapter.

As content is consumed, the indications provided by the alignment system 18 via the viewing system 20 may automatically change. For example, as the multimedia content 24 progresses, the progress bar 520 may reflect that a later portion of the multimedia content 24 is being displayed. Moreover, different paragraphs of the text of the text panel 42 may be indicated as words are spoken in the multimedia content 24. Furthermore, as the multimedia content 24 and text of the transcript 22 associated with the multimedia content 24 changes from one chapter to another, the current chapter may be indicated by the current chapter indicator 524.

Additionally, it should be noted that, in other embodiments, the current paragraph indicator 522 may differ. For example, a current paragraph may be highlighted, color-coded, presented in bold text, or other forms of visual indications. Similarly, the current chapter indicator 524 may differ in other embodiments. For example, the current chapter may be indicated by highlighting, color-coding, or presenting in bold text the currently playing chapter or by otherwise visually indicating the current chapter.

Furthermore, although the foregoing description with respect to FIGS. 11-13 provides for an alignment system 18 that interfaces with a user to provide a desired portion of video content synchronized with the corresponding portion of transcript or to provide a desired portion of transcript synchronized with the corresponding portion of video content, in a different example, another entity such as a server may interface with the user instead. In this example, the server may receive multimedia content, text data, and alignment information (e.g., all or a portion of the data as described with respect to FIG. 4 and any other alignment information generated by the alignment system 18) from the alignment system 18 and perform one or more parts of the process 500 as described with respect to FIG. 10.

Accordingly, the presently disclosed techniques enable multimedia content, such as videos, to be aligned with text, such as text included in transcripts. Additionally, as discussed above, the techniques provided herein enable text that differs from the words spoken in the multimedia content to be aligned. Furthermore, the presently disclosed techniques enable corresponding portions of multimedia content and/or text to be provided based on a request from a viewer of the multimedia content.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory machine-readable medium comprising machine readable instructions that, when executed by processing circuitry, cause the processing circuitry to:
receive multimedia content comprising a plurality of multimedia content portions of the multimedia content;
receive text data corresponding to words spoken in the multimedia content, wherein the text data comprises a plurality of text data subdivisions of the text data, wherein each subdivision of the plurality of text data subdivisions comprises a plurality of secondary subdivisions;
align the multimedia content and the text data by determining, for each of the plurality of secondary subdivisions, a corresponding portion of a multimedia content portion of the plurality of multimedia content portions, by:
performing a higher specificity pass by:
generating, from the text data, a phrase search list comprising a plurality of phrases of a first number of words; and
determining whether each phrase of the plurality of phrases corresponds to the multimedia content by determining whether the words of each phrase correspond to a portion of the words spoken in the multimedia content and performing a lower specificity pass by:
receiving data indicative of one or more secondary subdivisions of the plurality of secondary subdivisions that were not aligned during the higher specificity pass; and
generating, from a portion of the text data corresponding to the one or more secondary subdivisions of the plurality of secondary subdivisions that were not aligned during the higher specificity pass, a second phrase search list comprising a second plurality of phrases of a second number of words, wherein the second number of words is less than the first number of words; and
cause display of the multimedia content aligned to the text data.

2. The tangible, non-transitory machine-readable medium of claim 1, wherein the text data is indicative of a first plurality of words, wherein the multimedia content is associated with a second plurality of words, wherein the first plurality of words differs from the second plurality of words.

3. The tangible, non-transitory machine-readable medium of claim 1, wherein the instructions are configured to cause the processing circuitry to determine a time associated with each portion of the plurality of multimedia content portions that the secondary subdivision of the plurality of secondary subdivisions corresponds to, by:
converting the text data into a first plurality of phonemes;
generating audio data from the multimedia content;
generating a second plurality of phonemes from the audio data; and
comparing a portion of the first plurality of phonemes to a portion of the second plurality of phonemes.

4. The tangible, non-transitory machine-readable medium of claim 1, wherein the instructions are configured to cause the processing circuitry to:
perform an unaligned content pass for each secondary subdivision of the plurality of secondary subdivisions that remains unaligned after performing the higher specificity pass and the lower specificity pass.

5. The tangible, non-transitory machine-readable medium of claim 4, wherein the instructions are configured to cause the processing circuitry to perform the unaligned content pass, wherein performing the unaligned content pass comprises:
determining a first aligned secondary subdivision that occurs most immediately before a secondary subdivision for which the corresponding portion of a multimedia content portion of the plurality of multimedia content portions was not identified during the first pass or the second pass; and
determining a second aligned secondary subdivision that occurs most immediately after the secondary subdivision.

6. The tangible, non-transitory machine-readable medium of claim 5, wherein the instructions are configured to cause the processing circuitry to perform the unaligned content pass, wherein performing the unaligned content pass comprises determining a starting point for the secondary subdivision based at least in part on:
a first amount of words that occur between the secondary subdivision and the first aligned secondary subdivision; and a second amount of words that occur between the secondary subdivision and the second aligned secondary subdivision.

7. The tangible, non-transitory machine-readable medium of claim 1, wherein the instructions are configured to cause the processing circuitry to perform the lower specificity pass by:
determining whether each phrase of the second plurality of phrases corresponds to the multimedia content by determining whether the words of each phrase of the second plurality of phrases correspond to a portion of the words spoken in the multimedia content.

8. A machine-implemented method for providing real-time automated logging of broadcast content, comprising:
receiving, from a multimedia content database, multimedia content comprising a plurality of multimedia content portions of the multimedia content;
receiving, from a transcript database, text data corresponding to words spoken in the multimedia content, wherein the text data comprises a plurality of text data subdivisions of the text data, wherein each of the plurality of text data subdivisions comprises a plurality of secondary subdivisions;
aligning the multimedia content and the text data by determining, for each of the plurality of secondary subdivisions, a corresponding portion of a multimedia content portion of the plurality of multimedia content portions, by:
performing a first pass by:
generating, from the text data, a first phrase search list for each of the plurality of text data subdivisions, wherein the first phrase search list comprises a first plurality of phrases each comprising a first number of words; and
determining whether each phrase of the first plurality of phrases corresponds to the multimedia content by determining whether the words of each phrase correspond to a portion of the words spoken in the multimedia content and performing a second pass, by:
generating, from the text data, a second phrase search list for each of the plurality of secondary subdivisions for which the corresponding portion of a subdivision of the plurality of multimedia content portions was not identified during the first pass, wherein the second phrase search list comprises a second plurality of phrases each comprising a second number of words; and
determining whether each phrase of the second plurality of phrases corresponds to the multimedia content by determining whether the words of each phrase of the second plurality of phrases correspond to a portion of the words spoken in the multimedia content; and
causing display of the multimedia content aligned to the text data.

9. The method of claim 8, wherein performing the first pass comprises:
for each phrase of the first plurality of phrases determined to correspond to the multimedia content, indicating a secondary subdivision of the plurality of secondary subdivisions is aligned when one of the phrases of the first plurality of phrases determined to correspond to the multimedia content occurs within a threshold amount of time from a beginning of the secondary subdivision.

10. The method of claim 8, wherein aligning the multimedia content and the text data comprises performing a third pass, wherein performing the third pass comprises, for each of the plurality of secondary subdivisions for which a corresponding portion of the multimedia content was not identified during the first pass or the second pass:
determining a first aligned secondary subdivision that occurs most immediately before a secondary subdivision for which the corresponding portion of a multimedia content portion of the plurality of multimedia content portions was not identified during the first pass or the second pass;
determining a second aligned secondary subdivision that occurs most immediately after the secondary subdivision; and
determining a starting point for the secondary subdivision based at least in part on:
a first amount of words that occur between the secondary subdivision and the first aligned secondary subdivision; and
a second amount of words that occur between the secondary subdivision and the second aligned secondary subdivision.

11. The method of claim 8, wherein the second number of words is equal to or less than the first number of words.

12. The method of claim 8, wherein:
the plurality of multimedia content portions and the plurality of text data subdivisions correspond to a plurality of chapters; and
the plurality of secondary subdivisions correspond to a plurality of paragraphs.

13. A multimedia content and text alignment system, comprising:
a multimedia content database comprising multimedia content, wherein the multimedia content comprises a plurality of multimedia content portions of the multimedia content;
a transcript database comprising text data corresponding to words spoken in the multimedia content, wherein the text data comprises a plurality of text data subdivisions of the text data, wherein each of the plurality of text data subdivisions comprises a plurality of secondary subdivisions;
an alignment system comprising processing circuitry configured to:
receive, from the multimedia content database, the multimedia content;
receive, from the transcript database, the text data; and
align the multimedia content and the text data by determining, for each of the plurality of secondary subdivisions, a corresponding portion of a multimedia content portion of the plurality of multimedia content portions, by:
performing a first pass by:
generating, from the text data, a first phrase search list for each of the plurality of text data subdivisions, wherein the first phrase search list comprises a first plurality of phrases each comprising a first number of words; and
determining whether each phrase of the first plurality of phrases corresponds to the multimedia content by determining whether the words of each phrase correspond to a portion of the words spoken in the multimedia content and performing a second pass, by:
generating, from the text data, a second phrase search list for each of the plurality of secondary subdivisions for which the corresponding portion of a subdivision of the plurality of multimedia content portions was not identified during the first pass, wherein the second phrase search list comprises a second plurality of phrases each comprising a second number of words; and determining whether each phrase of the second plurality of phrases corresponds to the multimedia content by determining whether the words of each phrase of the second plurality of phrases correspond to a portion of the words spoken in the multimedia content.

14. The multimedia content and text alignment system of claim 13, wherein the processing circuitry is configured to align the multimedia content and the text data by determining a starting time for each of the plurality of secondary subdivisions, wherein the starting time corresponds to a playback time of the multimedia content at which the corresponding portion of the multimedia content portion of the plurality of multimedia content portions occurs.

15. The multimedia content and text alignment system of claim 14, wherein the processing circuitry is configured to determine the starting time by:

comparing a portion of a secondary subdivision of the plurality of secondary subdivisions of a text data subdivision of the plurality of text data subdivisions to a particular multimedia content portion of the plurality of multimedia content portions that corresponds to the text data subdivision of the plurality of text data subdivisions.

16. The multimedia content and text alignment system of claim 13, comprising a viewing system configured to:

receive, from the alignment system, the multimedia content aligned to the text data; and display the multimedia content aligned to the text data.

17. The multimedia content and text alignment system of claim 16, wherein the viewing system is configured to provide an indication of at least two of:

a current portion of the multimedia content being displayed;

a current text data subdivision of the plurality of text data subdivisions corresponding to the current portion of the multimedia content being displayed; and a current secondary subdivision of the plurality of secondary subdivisions corresponding to the current portion of the multimedia content being displayed.

18. The multimedia content and text alignment system of claim 13, wherein the alignment system is configured to align the multimedia content and the text data by performing a third pass, wherein performing the third pass comprises, for each of the plurality of secondary subdivisions for which a corresponding portion of the multimedia content was not identified during the first pass or the second pass:

determining a first aligned secondary subdivision that occurs most immediately before a secondary subdivision for which the corresponding portion of a multimedia content portion of the plurality of multimedia content portions was not identified during the first pass or the second pass;

determining a second aligned secondary subdivision that occurs most immediately after the secondary subdivision; and determining a starting point for the secondary subdivision based at least in part on:

a first amount of words that occur between the secondary subdivision and the first aligned secondary subdivision; and a second amount of words that occur between the secondary subdivision and the second aligned secondary subdivision.

19. The multimedia content and text alignment system of claim 17, wherein the multimedia content and alignment system is configured to:

receive a user input indicative of a selection of a secondary subdivision of the plurality of secondary subdivisions;

determine, via the alignment system, a portion of the multimedia content corresponding to the selected secondary subdivision; and displaying, via the viewing system, the portion of the multimedia content corresponding to the selected secondary subdivision.

20. The multimedia content and text alignment system of claim 17, wherein the viewing system is configured to provide and indication of:

the current portion of the multimedia content being displayed;

the current text data subdivision of the plurality of text data subdivisions corresponding to the current portion of the multimedia content being displayed; and the current secondary subdivision of the plurality of secondary subdivisions corresponding to the current portion of the multimedia content being displayed.

* * * * *